Ronald R. Rabenold, Allison Park, and Edward S. Kondrad, New Kensington, Pa., assignors to PPG Industries, Inc., Pittsburgh, Pa., a corporation of Pennsylvania
No Drawing. Filed Aug. 1, 1968, Ser. No. 749,292
Int. Cl. C08f 21/00; C08g 51/04
U.S. Cl. 260—40                                           11 Claims

ABSTRACT OF THE DISCLOSURE

Unsaturated polyesters are graft polymerized onto thermoplastic polymers by esterification or transesterification. The graft copolymers derived therefrom may be used as glass fiber binders and more particularly in matched metal molds to produce moldings having excellent surface properties.

---

Glass fibers are extensively used in reinforcing molded resinous products and in similar applications in which their properties, such as strength, appearance, and durability, are advantageously utilized. The glass fibers are bonded with polyester binding resins and molded into the final product. The various methods of preparing the molded products are from glass fiber mats of preforms, bulk molding compounds, or sheet molding compounds.

There are various problems associated with the final molded products in that smooth surfaces are very difficult to achieve and the molded articles having a tendency to crack, especially using mat or preform techniques, as most cracking is exhibited in resin-rich areas of the product. This is very important when the molded article is to be used for automobile bodies and similar articles which may be painted, and which require a smooth, glossy surface which will not crack during the paint bake cycle.

It has now been discovered that glass fiber reinforced molded products which have exceedingly smooth surfaces with little or no cracking problems are obtained, using as a binding resin for the glass fibers, a graft copolymer of unsaturated polyester resins and thermoplastic polymers containing functional groups capable of being esterified or transesterified.

The graft copolymers of this invention are the products of the copolymerization of unsaturated polyester resins, formed by the reaction product of a polymerizable ethylenically unsaturated dicarboxylic acid and a glycol, with thermoplastic polymers containing functional groups capable of being esterified or transesterified.

The unsaturated polyesters are ordinarily made from an acid component comprised of an ethylenically unsaturated carboxylic acid and optionally, a member selected from the group consisting of saturated dicarboxylic acids and aromatic dicarboxylic acids (i.e., acids which are aromatically unsaturated only), and one or more polyhydric alcohols.

The ethylenically unsaturated polycarboxylic acids used in forming the polyester may include such acids as maleic acid, fumaric acid, aconitic acid, mesaconic acid, citraconic acid, itaconic acid, and halo and alkyl derivatives of such acids, and the like. The preferred acid is maleic acid. The anhydrides of these acids, where the anhydrides exist, are embraced under the term "acid" since the polyesters obtained therefrom are essentially the same whether the acid or anhydride is utilized in the reaction.

Saturated dicarboxylic acids and aromatic dicarboxylic acids are often utilized in combination with the unsaturated acid or anhydride in the preparation of unsaturated polyester resins. Such acids increase the length of the polyester chain without adding additional cross-linking sites, which is a desired feature in some polyesters. Examples of useful saturated and aromatic dicarboxylic acids include succinic acid, adipic acid, suberic acid, azelaic acid, sebacic acid, phthalic acid, isophthalic acid, terephthalic acid, tetrachlorophthalic acid, hexachloroendomethylene tetrahydrophthalic acid, and the like. As in the case of the ethylenically unsaturated acids, the anhydrides of these acids, where the anhydrides exist, are included in the term "acid."

The ethylenically unsaturated dicarboxylic acids are conventionally employed in an amount of about 10 mole percent to 100 mole percent of the acid component of the polyester, although preferably the ethylenically unsaturated dicarboxylic acids comprise from about 40 mole percent to about 100 mole percent of the acid, with the rest being a saturated dicarboxylic acid and/or an aromatic dicarboxylic acid.

Some polyhydric alcohols useful in preparing unsaturated polyester resins include ethylene glycol, diethylene glycol, polyethylene glycol, propylene glycol, dipropylene glycol, polypropylene glycol, glycerol, neopentyl glycol, pentaerythritol, trimethylolpropane, trimethylolethane, 1,3-butanediol, and the like. The preferred polyols for the purpose of this invention have a molecular weight of less than about 2,000 and consist of carbon, hydrogen and oxygen. The polyhydric alcohols are generally employed in an equal molar ratio to the total acid components or as a slight excess as, for example, about 5 mole percent excess.

The polyester is formed by usual procedures, such as by heating the polycarboxylic acid component and polyhydric alcohol component to a temperature of from about 150° C. to about 300° C. under an inert gas sparge until water of reaction substantially ceases to evolve, or until the mixture has reached a reasonably low acid value (e.g., 5 to 50). An esterification catalyst may be added to speed up the reaction. Any esterification catalyst may be used. Examples are $Bu_2SnO$, $SnCl_2$, $SnF_2$, $BuSn(OH)_3$, $BuSnCl_3$, and the like. The amount of catalyst is not critical, but generally the reaction mixture contains approximately 0.1 to 0.5 percent by weight of catalyst.

The unsaturated polyester is graft copolymerized with a thermoplastic polymer containing functional groups capable of being esterified or transesterified. Any thermoplastic polymer having a backbone containing these functional groups may be used. Examples of these functional groups are ester groups, carboxyl groups and hydroxyl groups. Such groups are provided by including in the polymer units derived from monomers containing such a group in addition to a polymerizable group such as a vinyl group or other group containing polymerizable ethylenic site. Monomers which can be utilized in this manner include vinyl esters, such as vinyl acetate, vinyl propionate, vinyl butyrate, and the like; esters of unsaturated acids, such as ethyl acrylate, butyl acrylate, methyl methacrylate, and other alkyl or substituted alkyl esters of acrylic acid, methacrylic acid, maleic acid, fumaric acid, and other unsaturated monocarboxylic or carboxylic acids; unsaturated acids, such as acrylic acid, methacrylic acid, maleic acid, fumaric acid, etc., and hydroxyl-containing monomers such as hydroxy alkyl esters of the aforesaid unsaturated acids, and other hydroxy monomers such as hydroxy ethyl vinyl sulfide. Mixtures of such monomers can be used as can monomers containing several functional groups such as butyl hydrogen maleate, ethyl hydrogen fumarate, and the like.

The thermoplastic polymers used may be comprised of copolymers of the monomers containing the functional group described and other comonomers which may be selected for particular physical properties that they possess. For instance, if the product is desired to be chemically resistant, ethylene may be used as a comonomer or if good ultraviolet resistance is desired thermoplastic polymers containing methyl methacrylate may be used. Examples of particular thermoplastic copolymers that may be used are copolymers of ethylenically unsaturated monomers and vinyl esters such as copolymers of styrene and vinyl acetate, copolymers of ethylene and vinyl acetate; copolymers of ethylenically unsaturated monomers and esters of unsaturated acids such as copolymers of ethylene and ethyl acrylate, copolymers of ethylene and isobutyl acrylate; copolymers of ethylenically unsaturated monomers and unsaturated acids such as copolymers of ethylene and acrylic acid, styrene and methacrylic acid, and many others. Of course, the thermoplastic polymer need not necessarily be a copolymer of the monomer-containing functional groups and other comonomers, but may consist of polymers of the monomer containing functional groups alone.

The unsaturated polyester and thermoplastic polymer containing the functional groups specified are graft copolymerized.

The graft copolymerization is carried out by either an esterification reaction or a transesterification reaction with the functional groups of the thermoplastic polymer. If the thermoplastic polymer contains an ester group as the functional group, then the reaction is a transesterification, and if the thermoplastic contains other reactive groups which are capable of esterification, such as carboxyl or hydroxyl groups, the reaction is an esterification.

If the reaction is one of transesterification, the thermoplastic polymer may be added to the polyester components at any time during the preparation of the polyester. A transesterification catalyst ordinarily should be added and it is preferable that the catalyst be added near the end of the polyester cook. Examples of transesterification catalysts that may be used are lead oxide and titanium compounds, such as tetraisopropyl titanate, tetrabutyl titanate, and the like. The transesterification is carried out at approximately the same temperature as used for the preparation of the polyester and may be carried out until the polyester and thermoplastic polymers are completely reacted. There may be some additional esterification between the glycol and acid components forming the polyester, but the major reaction will be the transesterification.

If the reaction is one of esterification, it is best to add the thermoplastic polymer to the polyester after the polyester is all or nearly all formed so as to prevent gelling. The esterification reaction usually takes place at the same temperature as the preparation of the polyester. If desired, an esterification catalyst, such as those mentioned above, can be used but a catalyst is not always necessary.

Generally, the thermoplastic polymer constitutes from about 1 to about 35 weight percent of the graft copolymer, but higher or lower thermoplastic contents may be used depending on the composition of the thermoplastic polymer and the quality of surface and other physical properties desired. The thermoplastic polymer may comprise any composition so long as some groups capable of esterification or transesterification are present in the polymer.

The graft copolymers so formed are then added to polymerizable ethylenically unsaturated monomers and cross-linked.

The polymerizable ethylenically unsaturated monomers which cross-link with the graft copolymers to form thermosetting materials include monomers such as styrene, alpha-methyl styrene, divinyl benzene, vinyl acetate, allyl acetate, diallyl phthalate, diallyl succinate, diallyl adipate, diallyl sebacate, methyl acrylate, methyl methacrylate, hexyl acrylate, octyl acrylate, octyl methacrylate, diallyl itaconate, diallyl maleate, diallyl fumarate, triallyl cyanurate, and the like. The preferred monomers are liquid compounds soluble in the polyester component. Such monomers should preferably be free of non-aromatic carbon to carbon conjugated double bonds.

The monomer component or components may be employed over a broad range of proportions, but usually on a weight basis the amount of monomer is less than the graft copolymer component. The amount of monomer is generally sufficient to provide a liquid, flowable interpolymerizable mixture. Ordinarily, the percentage of monomer falls within the range of about 10 percent to about 60 percent by weight of the total mixture of polyester and monomer. In the preferred compositions, the monomer is present in an amount of about 20 percent to about 50 percent.

Since the graft copolymer components of the interpolymerizable mixture are often highly viscous or even solid at ambient temperatures, it is preferred to add the monomers thereto at a temperature sufficient to render the graft copolymer satisfactorily fluid for incorporation with the monomer. This temperature is usually in the range of about 180° F. to about 220° F., which in many cases may be sufficiently high to induce premature gelation in the absence of gelation inhibitors, upon introduction of the monomer in the system.

It is, therefore, advisable to use gelation inhibitors to prevent premature gelation. Suitable inhibitors may be selected from the quinonic or phenolic class or from a group of quaternary ammonium salts and amine salts especially amine halide salts. Suitable inhibitors of the quinonic or phenolic class include:

p-benzoquinone
chloranil
hydroquinone
3-isopropyl catechol
4-t-butyl catechol
3-methyl catechol
4-ethyl catechol
4-isopropyl catechol and the like.

The following are representative examples of halide salts of amines which may be employed as inhibitors:

trimethylamine hydrochloride
triethylamine hydrobromide
dimethylaniline hydrochloride
triethylamine hydrochloride
tri-n-butylamine hydrochloride
tribenzylamine hydrobromide
N-benzylaniline hydrochloride and the like. Useful quaternary ammonium salts include:

trimethyl benzyl ammonium acid oxalate
trimethyl benzyl ammonium chloride
di(trimethyl benzyl ammonium) oxalate
trimethyl benzyl ammonium maleate
trimethyl benzyl ammonium tartrate and the like. Other useful ammonium compounds and amine halide compounds are disclosed in U.S. Pats. 2,593,787 and 2,646,416, respectively.

The amount of inhibitor used in the mixture during the mixing stage is susceptible to wide variation, but conveniently is in a range of about 0.001 percent to about 0.1 percent by weight, based upon the polyester component of the mixture.

Accelerators may also be used. A number of such accelerators are described in the book Polyesters and Their Applications by Bjorksten, Reinhold Publishing Corp. (1956), see especially p. 66.

For purposes of increasing the speed of copolymerization of the mixture, a catalyst such as a free radical type catalyst is usually added to the liquid mixture of polyester and the monomer. These catalysts include benzoyl peroxide, cumene hydroperoxide, lauryl peroxide, or any of the conventional peroxidic or similar catalysts of addition reaction. The catalyst should be added to the copolymerizable mixtures while they are relatively cool in order to obviate any undue tendency to premature gelation. In practice, a catalyst is generally added to the mixtures shortly before use of the copolymers.

The solubilized graft copolymers may be used for the many purposes that polyester resins are conventionally utilized for. The compositions of this invention may have special uses as they may be made to be thixotropic without addition of thixotropic agents. The preferred uses, however, are as binding resins for glass fibers.

Preforms are formed by setting long glass fibers in a mold and adding binding resin by pouring it on the glass fibers and then setting the mixture in a conventional press at elevated temperatures. The preform is used when very strong materials are desired. The graft copolymers of this invention when solubilized in an ethylenically unsaturated monomer form excellent binding resin for preforms.

Bulk molding compounds are formed by adding mineral filler material in an amount of up to about 75 percent of the final composition to glass fibers and forming a mix with a dough-like consistency by adding binding resin. The material is then put in a conventional press mold and heated at elevated temperatures to set. The bulk molding process is used to obtain configurations that are complex. This is achieved as the fiber length is short and the material is highly flowable. The graft copolymers of this invention are especially useful as binding resin for bulk molding compounds as the molded compounds formed by setting the composition using the graft copolymer as the binding resin forms a product having a smooth glossy surface which has exceptional crack resistance.

Sheet molding compounds are formed by adding to a binding resin from about 15 to about 40 percent by weight of chopped glass fibers (which are generally longer than those used for bulk molding compounds), filler material (in somewhat lesser proportions than that used in bulk molding compounds), and thickeners (which are optional for use in bulk molding compounds) such as metal oxides, such as magnesium oxide, zinc oxide, and others, and metal hydroxides such as calcium hydroxide and the like. The composition is then set in a conventional press mold at elevated temperatures. The sheet molding process is used to obtain a product which has more strength than the product of the bulk molding process and is more flowable than that of the preform process. Thus, products with properties falling between properties attained by the two aforementioned processes may be obtained by use of the sheet molding process. The graft copolymers of this invention are again especially desirable as a binding resin for sheet molding compounds as the molded products formed using these graft copolymers have exceptionally smooth surfaces and are crack resistant.

The following examples set forth specific embodiments of the instant invention. However, the invention is not to be construed as being limited to these embodiments for there are, of course, numerous possible variations and modifications.

All parts and percentages in the examples, as well as throughout the specification, are by weight unless otherwise indicated.

EXAMPLE I

A graft copolymer was prepared by mixing 1034 parts of isophthalic acid, 853 parts of propylene glycol and 1.9 parts of butyl stannoic acid in a vessel and heated at 210° C. for 4 hours. At that time, 1132 parts of maleic anhydrate and 488 parts of propylene glycol were added and the mixture heated at 210° C. for an additional 2½ hours. At that time, 525 parts of an ethylene-vinyl acetate copolymer were added and the mixture was heated to 210° C. for an additional 4 hours at which time 0.5 part of lead oxide was added and the mixture was heated at 210° C. for 1 additional hour to an acid number of 22.8.

The graft copolymer was then solubilized by adding 55 parts of the copolymer to 45 parts of styrene and 0.01 part of hydroquinone at 110° C.

EXAMPLE II

A graft copolymer was prepared by mixing 5830 parts of isophthalic acid, 4800 parts of propylene glycol and 16.3 parts of butyl stannoic acid in a vessel and heated at 210° C. for 4½ hours. At that time, 6380 parts of maleic anhydride and 2980 parts of propylene glycol were added and the mixture heated at 210° C. for 5½ hours. Twenty-five hundred parts of the above polyester were then mixed with 426 parts of ethylene-ethyl acetate and 0.85 part of tetraisopropyl titanate and heated at 210° C. for 2½ hours yielding a graft copolymer having an acid number of 28.8.

The above copolymer was thinned by mixing 55 parts of the copolymer with 45 parts of styrene and 0.01 of hydroquinone at 110° C. The final product had a Gardner-Holdt viscosity of $Z^3$.

EXAMPLE III

A graft copolymer was prepared as follows: a polyester resin was prepared by mixing 583 parts of isophthalic acid, 4880 parts of propylene glycol and 16.3 parts of butyl stannoic acid in a vessel and heated at 210° C. for 4½ hours. At that time 6380 parts of maleic anhydride and 2980 parts of propylene glycol were added and the mixture heated at 210° C. for an additional 5½ hours. To 2500 parts of the above polyester were added 426 parts of ethylene-isobutyl acetate and 0.8 part of tetraisopropyl titanate. The mixture was heated for 2¼ hours at 210° C. yielding a graft copolymer having an acid number of 28.6.

The above copolymer was solublilized by mixing 55 parts of the copolymer with 45 parts of styrene and 0.01 part of hydroquinone at 110° C. The final product had a Gardner-Holdt viscosity of $Z^2$.

EXAMPLE IV

A graft copolymer was prepared by mixing 1034 parts of isophthalic acid, 853 parts of propylene glycol and 1.9 parts of butyl stannoic acid in a vessel and heated at 210° C. for 4 hours. At that time, 1132 parts of maleic anhydrate and 488 parts of propylene glycol were added and the mixture heated at 210° C. for an additional 2 hours. At that time 525 parts of polymethyl methacrylate and 0.525 part of lead oxide were added and the mixture was heated at 223° C. for 1 hour. At that time, 50 parts of propylene glycol were added and the mixture heated at 223° C. for an additional 1¼ hours. One part of tetraisopropyl titanate was added and the mixture was heated at 219° C. for 1 additional hour to an acid number of 18.1.

The graft copolymer was then solubilized by adding 55 parts of the copolymer to 45 parts of styrene and 0.01 part of hydroquinone at 110° C. The final product had a Gardner-Holdt viscosity of Z+.

EXAMPLE V

A graft copolymer was prepared by mixing 920 parts of isophthalic acid, 760 parts of propylene glycol and 2.5 parts of butyl stannoic acid in a vessel and heating it to 210° C. for 3½ hours. At that time 1010 parts of maleic anhydride and 278 parts of propylene glycol were added and the mixture was heated at 210° C. for an additional ½ hour. To this mixture was added 322 parts of ethylene-acrylic acid and the temperature was maintained at 210° C. for 1 hour at which time an additional 276 parts of propylene glycol and 0.36 part of hydroquinone were added. The mixture was heated for 6 additional hours at 210° C. to an acid number of 12.15.

EXAMPLE VI

A reform was prepared by inserting a layer of 2 ounce glass fibers in a conventional press mold and pouring over the fibers 350 parts of a resin comprising 100 parts of the solubilized graft copolymer of Example I, 50 parts of calcium carbonate, 0.8 part of benzoyl peroxide and 0.2 part of an internal lubricant. The pressure was set at 60 tons in the press and the press was heated to 250° F. and closed for 2¼ minutes.

The resulting preform was then post-baked at 250° F. for 1 hour. A visual test indicated no cracks present.

This preform was compared to a preform made in the same manner using as the binding resin a styrene solubilized polyester resin formed without the addition of the ethylene-vinyl acetate. This preform was post-baked at 250° F. for 1 hour and a visual test indicated that 50 cracks were present in this particular preform.

EXAMPLE VII

A bulk molding compound was formed by premixing 250 parts of the solubilized graft copolymer of Example I, 2.5 parts of benzoyl peroxide, 12.5 parts of zinc stearate, 650 parts of calcium carbonate and 190 parts of ¼" chopped glass.

The premix was then inserted in a conventional press mold and the press was heated to 275° F. and closed. The pressure was set at 60 tons and the press was kept closed for 2¼ minutes. The resulting panel showed excellent gloss and surface smoothness.

EXAMPLE VIII

A sheet molding compound was formed by premixing 100 parts of the solubilized graft copolymer of Example I, 8 parts of styrene, 2.4 parts of zinc stearate, 100 parts of calcium carbonate, 1 part of benzoyl peroxide, 30 parts of McNamee clay, and 4 parts of zinc oxide and 30 parts of ¼" glass fibers. The liquid material was placed in a mold and thickened to a semi-solid state. The material was then inserted in a conventional press mold and heated to 275° F. The press was set at 60 tons pressure and closed for 2¼ minutes. The resulting product had a smooth glossy surface.

According to the provisions of the patent statutes, there is described above the invention and what are now considered to be its best embodiments. However, within the scope of the appended claims, it is to be understood that the invention can be practiced otherwise than is specifically described.

What is claimed is:

1. A graft copolymer which is the product of copolymerizing:
   (a) an unsaturated polyester resin formed by the reaction of a polymerizable ethylenically unsaturated dicarboxylic acid and a glycol, and
   (b) a thermoplastic polymer containing functional groups capable of being esterified or transesterified wherein the unsaturated polyester resin constitutes from about 65 percent to about 99 percent of the copolymer and the thermoplastic polymer constitutes from about 1 percent to about 35 percent of the graft copolymer.

2. The graft copolymer of claim 1 wherein the thermoplastic polymers contain functional groups selected from the class consisting of hydroxyl groups, carboxyl groups, and ester groups.

3. The graft copolymer of claim 1 wherein the thermoplastic polymer is a styrene-vinyl acetate copolymer.

4. The graft copolymer of claim 1 wherein the thermoplastic polymer is an ethylene-vinyl acetate copolymer.

5. A resinous composition comprising a polymerizable ethylenically unsaturated compound and the graft copolymer of claim 1.

6. The composition of claim 5 wherein the polymerizable ethylenically unsaturated compound is styrene.

7. A bulk molding compound comprising chopped glass fibers, filler material, and the graft copolymer of claim 6.

8. A sheet molding compound comprising chopped glass fibers, filler material, a thickening agent, and the graft copolymer of claim 6.

9. A molded article having a smooth glossy surface comprising chopped glass fibers, filler material, and the graft copolymer of claim 5.

10. A molded article having a smooth glossy surface comprising chopped glass fibers, filler material, a thickening agent, and the graft copolymer of claim 5.

11. A molded article comprising glass fibers encased in the molded graft copolymer of claim 5.

References Cited

UNITED STATES PATENTS

| | | | |
|---|---|---|---|
| 3,391,222 | 7/1968 | Robitschek | 260—40X |
| 3,405,087 | 10/1968 | Fryd | 260—873X |

MORRIS LIEBMAN, Primary Examiner

L. T. JACOBS, Assistant Examiner

U.S. Cl. X.R.

260—862, 873